INVENTORS
HAROLD H. BRITTEN
LAWRENCE R. PEASLEE
BY
Robert P. Strack
ATTORNEY

INVENTORS
HAROLD H. BRITTEN
LAWRENCE R. PEASLEE
BY

Robert R. Strack
ATTORNEY

INVENTORS
HAROLD H. BRITTEN
LAWRENCE R. PEASLEE
BY
Robert P. Stack
ATTORNEY

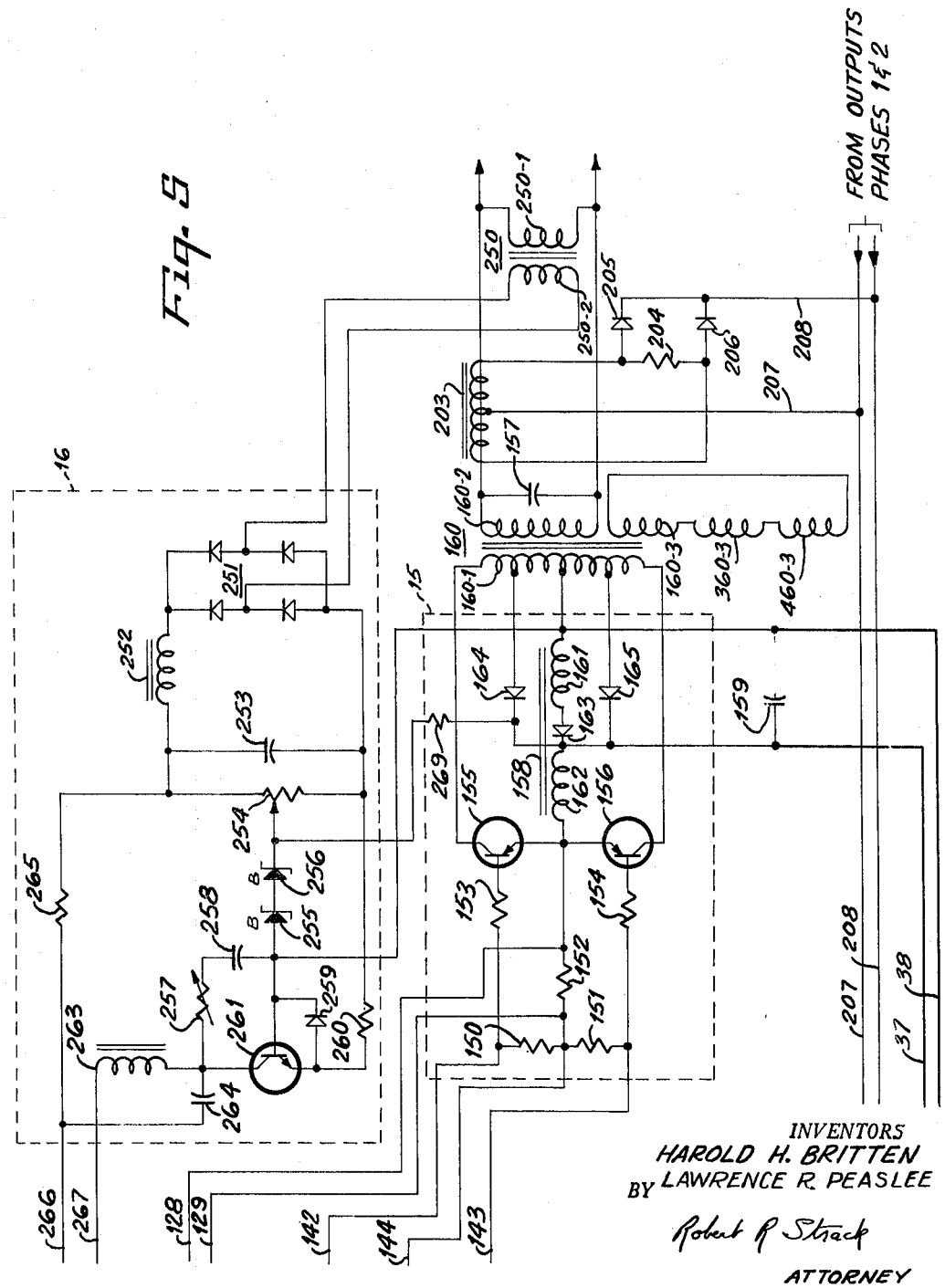

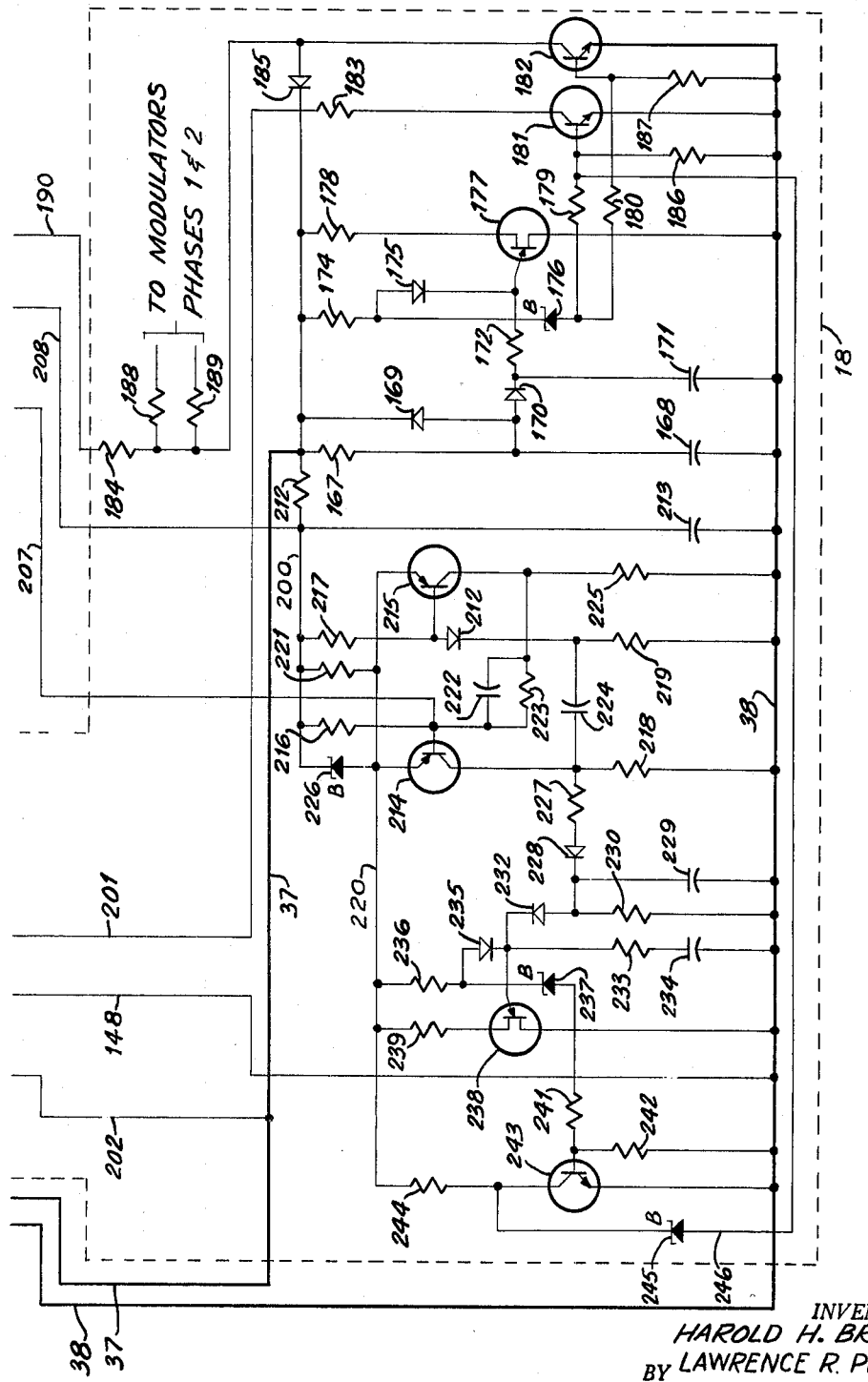

United States Patent Office 3,253,208
Patented May 24, 1966

3,253,208
STATIC INVERTER WITH OVERLOAD PROTECTION AND UTILIZING PULSE WIDTH MODULATION FOR VOLTAGE REGULATION
Harold H. Britten and Lawrence R. Peaslee, Waynesboro, Va., assignors to General Electric Company, a corporation of New York
Filed Aug. 22, 1961, Ser. No. 133,253
8 Claims. (Cl. 321—11)

This invention relates to a system for converting direct current power to multiphase alternating current power. Particularly, this invention relates to static inverters controlled by frequency sources to develop multiphase alternating currents having a frequency that is an accurate submultiple of said sources.

Static inverters are generally needed where there is a requirement for either high voltage direct current or alternating current in a relatively portable form or at a remote location where alternating current cannot be generated in conventional fashions. In general, the available sources of portable power provide a relatively low voltage direct current. To develop the higher voltage direct currents and the alternating currents often required, it is consequently necessary to use a conversion means.

At present, there is great demand for the described types of power for use in aircraft, missiles, and rockets. The guidance systems and communication equipment used in conjunction with these vehicles require efficient, well-regulated, power supplies and often comprise equipment that is extremely sensitive and dependent upon frequency stability.

In the present state of the art, transistors and other solid state devices are available for fabrication of static inverters yielding high efficiency and reliability in combination with the desirable characteristics of light weight and small size. Whereas there are several possible modes of operation of solid state devices in inverters, it is found that switching operation is most efficient. In this type of operation, the output transistors are repetitively switched from full saturation to cut off. The switching is accomplished very rapidly through the high dissipation region of operation and consequently, the average power dissipated is kept small compared to the total power switched. A problem inherent in the use of transistors in such switching operation is the possible damage to the switching transistors during momentary or prolonged overloads. It is thus necessary to provide efficient means for protecting against overload and thus insure that the switching transistors carry no more than their rated load.

An object of the invention is to provide an improved transistorized multiphase static inverter having overload protection operative in response to excessive loading in one, two, or all output phases for a predetermined period of time.

Accuracy of frequency in the signal outputs of a static inverter is to a large extent determined by the type of control frequency source employed. It is commonly acknowledged that self-oscillating inverters do not provide the frequency stability available from inverters that are driven by highly stable independent frequency sources.

Another object of the invention is to provide an improved static inverter operative under the control of an independent frequency source to provide multiphase outputs at a frequency determined by the independent frequency source.

Another important characteristic of inverter circuitry is the regulation of its output. One method for controlling the voltage amplitude of the output is by pulse duration modulation. With this regulation technique, the time variation between the positive-going and negative-going portions of the output rectangular waveform is modified in order to modify the total power developed.

Another object of the invention is to provide an improved static inverter utilizing pulse width modulation for regulation of the multiphase alternating current power delivered.

In accordance with one embodiment, the static inverter of the present invention utilizes a digital phase splitter for developing a multiphase signal from a single phase frequency source. Each phase of the multiphase signal is individually amplified and modulated before application to a transistorized output stage. A static switching means is provided in each phase for separating the driving signals of the phase splitter from the inverter output stage in the event of overload or during the initial start-up period. A single protective circuit monitors the output of each phase individually and, in the event of overload for an excessive period of time, is operative to open the switching means in each phase.

Regulation is provided in the described embodiment by controlling the pulse width of the signal applied to the inverter output stages by a magnetic amplifier modulating circuit. This modulator is of the amplistat type. Individual voltage regulators are connected to the output of each phase and following rectification and comparison of the output voltage with a reference standard, the voltage regulators establish the current through the control windings of the amplistat modulator. A "start-up" circuit is also included which is effective for a predetermined time following application of direct current to the inverter circuit to bias the amplistat to an off condition and to open the above-mentioned switching means in each phase.

The novel features of the invention are set forth with particularity in the appended claims. The invention itself, however, both as to its organization and method of operation, together with further objects and features thereof may best be understood by reference to the following description taken in conjunction with the accompanying drawings wherein:

FIG. 1 is a block diagram schematic illustrating the basic elements of a static inverter in accordance with the invention; and FIGS. 2 through 6, when taken together as shown in the layout of FIG. 2A, comprise a circuit schematic of an illustrative form of the invention.

FIG. 1 illustrates the circuit arrangement of the present invention. As shown therein, a single phase frequency source 10 supplies a control signal to a phase splitter 11. The function of phase splitter 11 is to develop a balanced three-phase output wherein the phases are separated by 120°. Individual, but identical, chains of stages are driven by each phase from phase splitter 11 and produce pulse width modulated alternating current. Each chain of stages includes a power amplifier 12, an alternating current static switch 13, a modulator 14, and an inverter output stage 15. Voltage regulators, 16, are associated with each phase and provide a regulating feedback path from output stage 15 to the input of modulator 14. A common protective circuit 18 monitors the output of each phase and in the event of overload, actuates static switches 13 to remove the driving signals from modulators 14. Another function of protective circuit 18 is to provide a time delay following "start-up" of the inverter system during which the driving signal is removed from modulators 14. This insures against an output that is either too low in magnitude or unstable in frequency during this initial period. It also protects the output stages.

The specific circuit elements employed in a static inverter developed in accordance with the block diagram shown in FIG. 1 are illustrated in FIGS. 2 through 6. In FIGS. 2 through 6, the blocks shown in FIG. 1 are delineated by dashed lines which bear the numerical designation of their respective blocks. The detailed operation of circuitry within a single phase only is shown, due to the identity of circuitry in each phase chain.

GENERAL DESCRIPTION

In general, it will be seen that a square wave generator 19 in FIG. 2, is utilized as a frequency source from which the frequency of the ultimate output signal is derived. An amplifier, comprising NPN transistor 26 in conjunction with an emitter follower comprising PNP transistor 29, amplifies the output of square wave generator 19 and provides the driving pulses applied to the phase splitter 11. Phase splitter 11 comprises three stages of a transistorized shift register similar to the one described in the co-pending application Serial No. 127,677, filed July 28, 1961, by L. R. Peaslee and M. Rosenblatt, and assigned to the assignee of the present invention.

The square wave developed in the amplifying circuitry is used as a shift pulse to drive sequentially the stages of the specially designed shift register through six permutations of states in order to develop outputs from each stage which are displaced 60° from one another. These outputs are rectangular pulses having a repetition rate one-sixth that of the square wave generator frequency and are applied to power amplifiers 12, in FIG. 3, which are individual to each phase. Because the circuitry of each phase is identical from this point on, the detailed circuits are shown for phase 3 only.

The function of power amplifier 12 is to develop driving pulses for the inverter output stage 15. In this embodiment, two push-pull amplifiers are employed, comprising PNP transistors 82, 83, 94, and 95. Other designs include the use of transformer outputs from the stages of phase splitter 11; in this latter case, using additional amplification for the shift register input pulses. The specific arrangement used is a matter of design.

Control stages, comprising static switch 13 and modulator 14, in FIG. 4, are interposed between the output of power amplifier 12 and inverter output stage 15. Basically, static switch 13 comprises a switching transistor 122 serially connected with a pair of transistors 133 and 134 arranged in a push-pull configuration. The output of the push-pull amplifier of static switch 13 supplies magnetizing current via transformer 138 to the gate windings 135–1 and 135–2 of magnetic amplifier 135, from which a modulated output is derived in accordance with the existing output of the inverter stage 15 and particular operating conditions. By controlling the conduction of transistor 122 in static switch 13, the inverter output stages may be placed under, or removed from, the driving influence of the power amplifier 12. Protection circuit 18, located generally in FIG. 6, and including a common switching circuit in FIG. 4, controls the conduction state of transistor 122 and its counterpart in each of the other phases.

As fully described hereinafter, the common switching circuit containing PNP transistor 192 in FIG. 4 is controlled by timing circuits in FIG. 6 to supply cut-off bias to transistor 122 for a fixed period following application of D.-C. power and whenever an overload condition exists beyond a predetermined period of time. The "start-up" portion of protection circuit 18 which performs the former function is developed about unijunction transistor 177, while the overload protection portion of protection circuit 18 which performs the latter function is developed about unijunction transistor 238.

During normal operation, the magnetic amplifier 135 of modulator 14 periodically delivers switching pulses to inverter output stage 15 in FIG. 5 with a frequency determined by phase splitter 11 and having durations determined by the current in control windings 135–3, 135–4, and 135–5. The inverter output stage 15 essentially comprises switching transistors 155 and 156 which develop a rectangular alternating current that is subsequently filtered by a unique arrangement including portions 161, 162 of inductance 158. Voltage regulator 16, continuously monitors the output from inverter output stage 15 via transformer 250. The sampled output is rectified and compared with a reference standard developed across reference diodes 255 and 256 and is used to determine the proper current in control winding 135–4 to establish the desired output. Thus, variations in output are detected and compensated for, continuously.

A more complete understanding of the specific embodiment of the invention illustrated in circuit schematic form will be available following a detailed examination of the circuit elements and their operation. It is, of course, understood that specific items, such as voltage polarities, component types, and particular circuit configurations may be modified by one having ordinary skill of the art without departing from the spirit or teachings of the invention.

DETAILED DESCRIPTION

Figure 1:
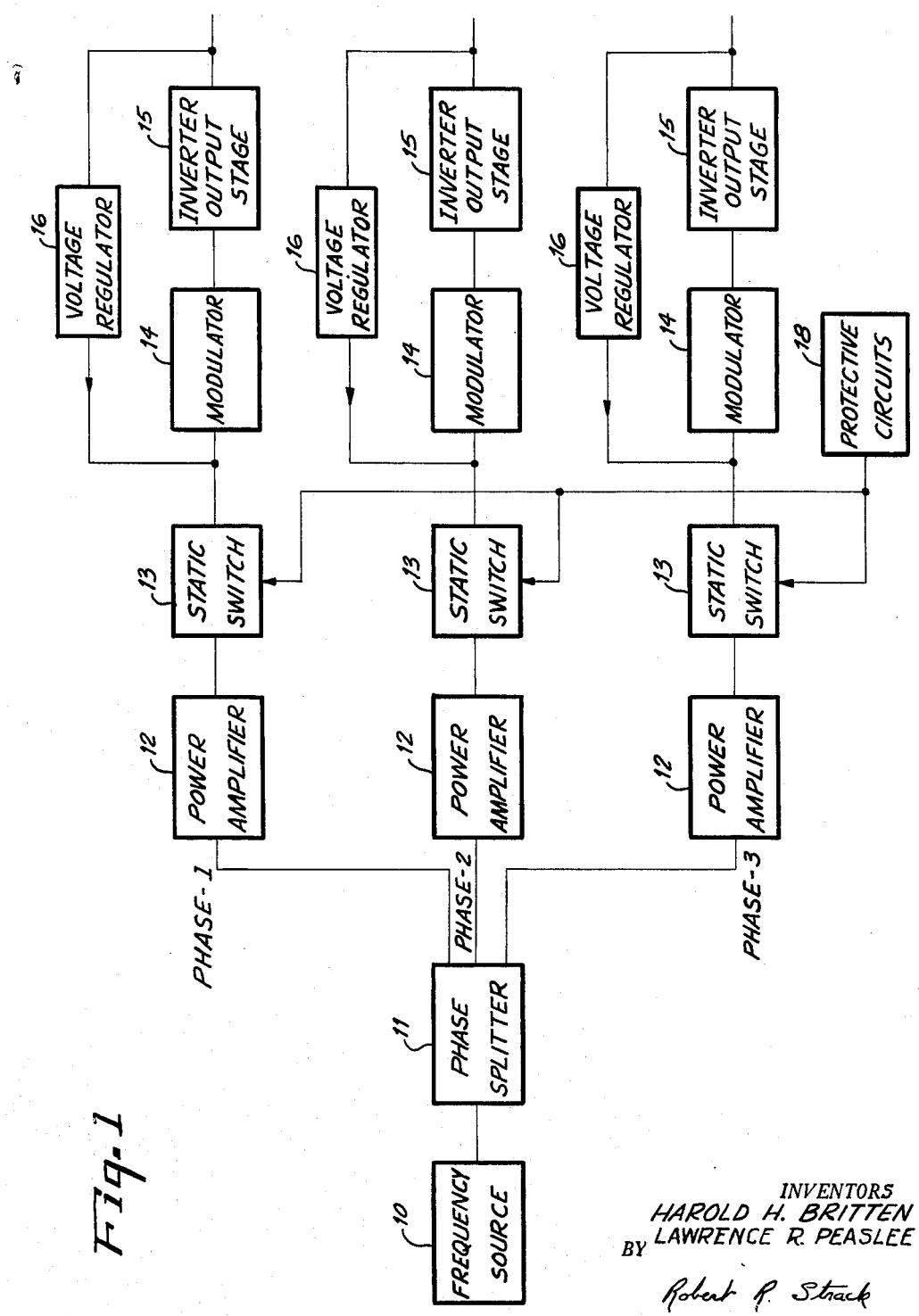
Figure 2:
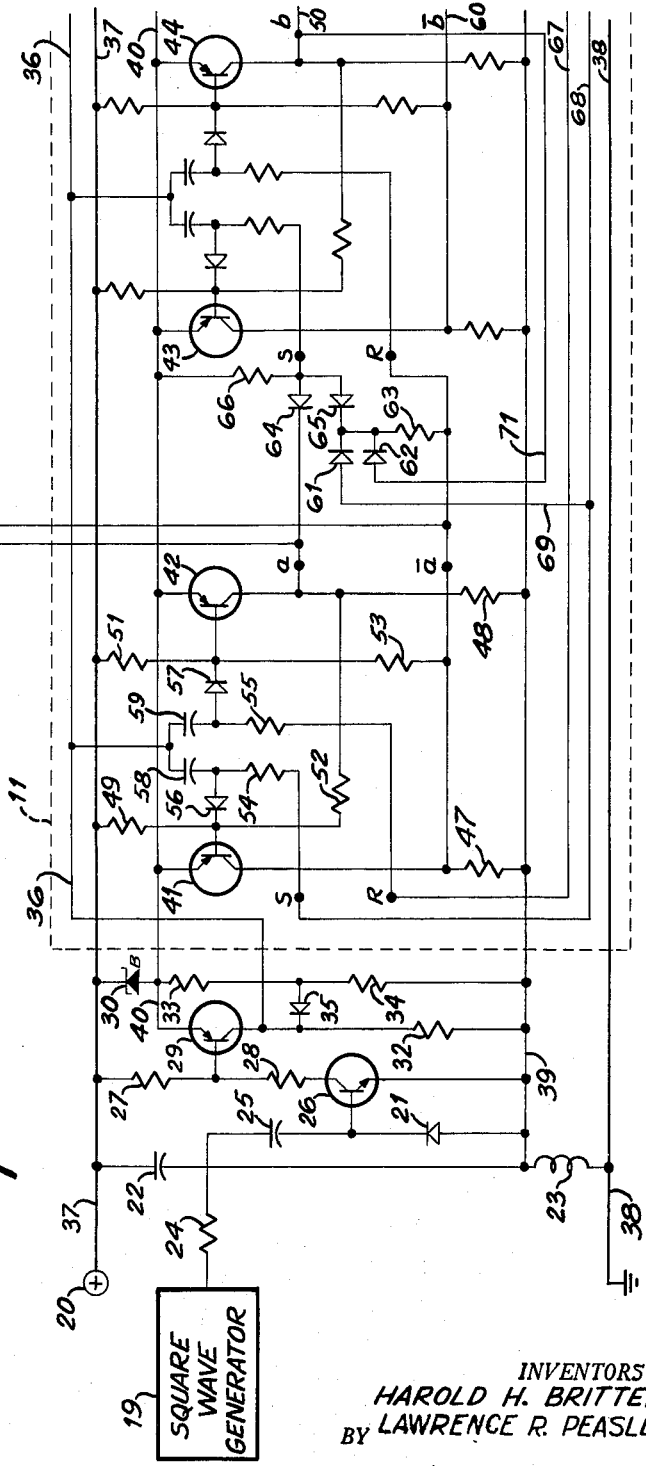
Figure 3:
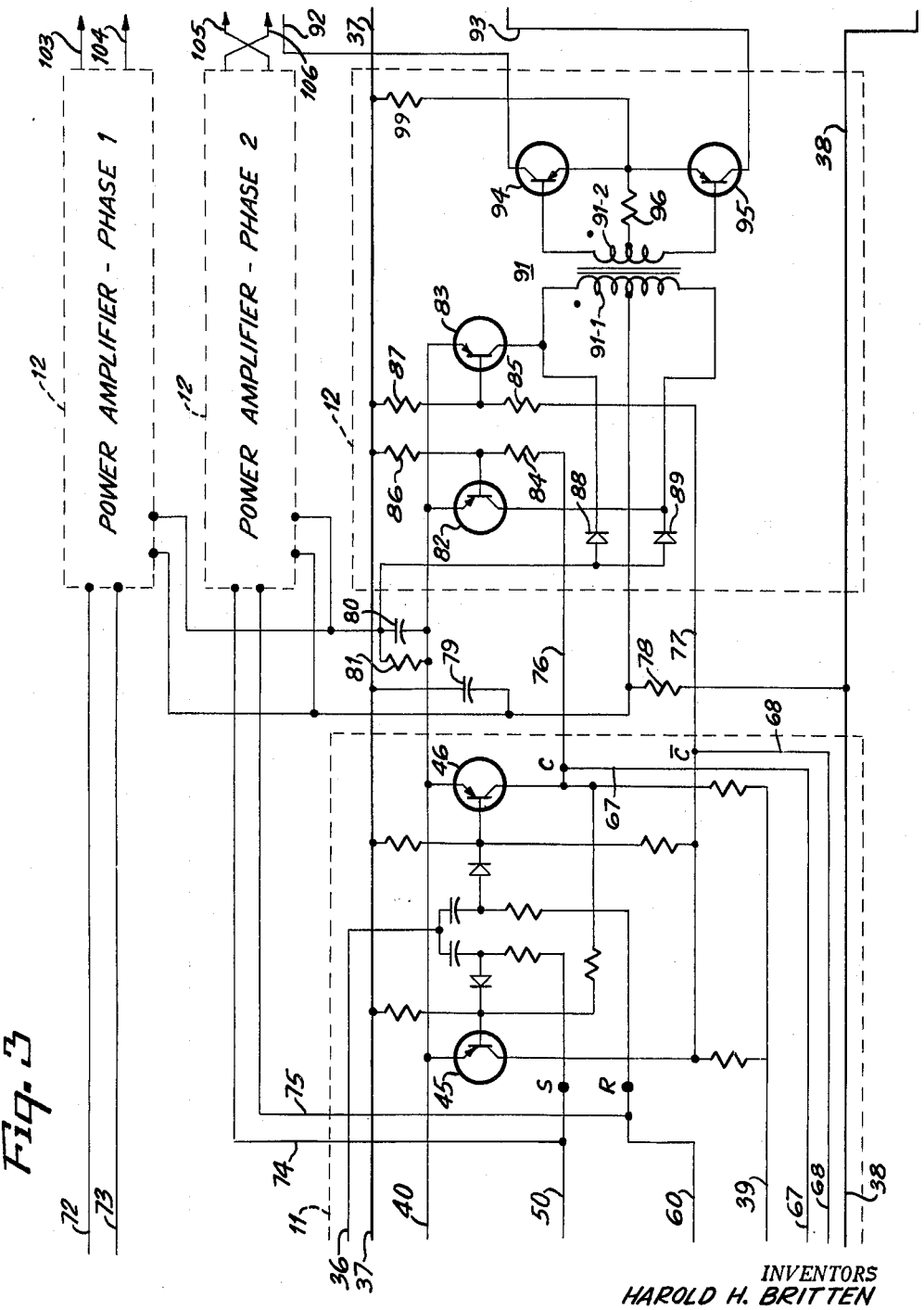

The output frequency of the static inverter is determined by square wave generator 19 on the left of FIG. 2. This generator may be of any well known form, the only requirement being that the output thereof be of sufficient magnitude to develop a control signal at the base of the amplifier comprising NPN transistor 26. Direct current supply for the circuit is illustrated generally by source 20, the magnitude of which is chosen to be adequate in accordance with the characteristics of the components used in the circuit. Filter capacitor 22 in conjunction with filtering inductance 23 are used to eliminate ripple current from D.-C. source 20 and thus insure stable frequency operation.

Transistor 26 is connected in a conventional amplifier configuration, the collector thereof being connected by load resistors 27 and 28 to positive voltage source 20 via positive voltage conductor 37 and the emitter thereof being connected by conductor 39 and filter inductance 23 to ground. The base of transistor 26 is clamped substantially to ground potential by suitably oriented rectifier 21 connected between it and conductor 39. PNP transistor 29 is also connected in an amplifier configuration having a load resistor 32 connected between the collector and a substantial ground at conductor 39 and having the emitter connected by voltage regulating diode 30 to positive conductor 37. The signal appearing at the junction of load resistors 27 and 28 is applied to the base of transistor 29.

As a consequence of the described connections, application of a square wave signal to the base of transistor 26 results in an amplified inverted square wave being applied to the base of transistor 29. Due to the amplification of transistor 29, a square wave is produced at the collector of transistor 29. This square wave is used as the shifting signal for the shift register phase splitter 11 and will be seen to be clamped by a rectifier 35, the anode of which is connected to the junction between resistors 33 and 34. The aforementioned resistors act as a voltage divider between conductor 40 and substantially ground at conductor 39. Conductor 40 is at a positive voltage that has a fixed relation to positive source 20, due to the presence of voltage regulating rectifier 30. The shift pulses developed at the output of transistor 29 are applied over conductor 36 to each stage of shift register phase splitter 11.

Phase splitter

The shift register phase splitter 11 is similar to that described in aforecited patent application Serial No. 127,677. Basically, it comprises three bistable stages, each of which consists of a transistor flip flop. As well known, a shift register having a three bistable stages can be programmed to sequentially produce up to eight stable permutations of states in response to successive triggering impulses. The illustrated shift register is limited by a combination OR-AND gate comprising diodes 61, 62, 64, and 65 and resistors 63 and 66 to produce only six stable permutations of states. Thus, in response to six successive triggering pulses on conductor 36, the shift register assumes six distinct permutations of states. At any one time two outputs are available from each stage. These outputs are 180° out of phase and they represent the particular state in which each bistable stage resides. By properly selecting the outputs of each stage, three discrete outputs are derived, each of which is 120° displaced in phase from its predecessor.

Because each stage in the shift register is identical, an examination of the first stage, comprising PNP transistors 41 and 42 will serve to illustrate operation of the phase splitter. Transistors 41 and 42 are symmetrically energized by connecting their emitters to the positive voltage appearing on line 40. Load resistors 47 and 48 connect the collectors of transistors 41 and 42 respectively to conductor 39 which may be considered for purposes of illustration to be at ground potential. A normally reversing bias is applied to each of transistors 41 and 42 by resistors 49 and 51 connected between positive conductor 37 and the respective transistor bases. It will be recognized that conductor 37 is at a higher potential than conductor 40 due to the constant voltage drop across voltage regulating diode 30. The bases of transistors 41 and 42 are connected via resistors 52 and 53 respectively to the collector electrodes of one another providing the necessary feedback paths for flip flop operation. It will be recognized that each flip flop will initially assume a state determined by the individual characteristics of the circuit elements. Subsequently, the state is determined by the triggering pulses and the state of other stages.

Control over the state in which each flip flop stage resides is achieved by supplying enabling voltages to set terminal S or reset terminal R illustrated to the left of each stage. Set terminal S is connected by a resistor 54 and suitably oriented rectifier 56 to apply positive voltages to the base of transistor 41 and reset terminal R is connected by a resistor 55 and suitably oriented rectifier 57 to apply positive voltages to the base of transistor 42. The shift pulses on conductor 36 are applied via capacitors 58 and 59 to the anodes of rectifiers 56 and 57 respectively and are effective to selectively deliver positive cut-off voltages to the transistor bases in accordance with the presence of enabling voltages on terminals S or R.

The output of each stage is derived from the collectors of the transistors. For example, in the first stage the outputs are obtained at the collectors of transistors 42 and 41 and are labeled $a$ and $\bar{a}$ respectively. The outputs of the outputs of the second and third stage of phase splitter 11 are similarly connected and are labeled $b$, $\bar{b}$ and $c$, $\bar{c}$ respectively. The illustrated notation indicates the nature of the outputs. It is understood that each stage may reside in either of two states. These states are exactly the opposite of one another and consequently, the outputs are exactly the opposite to one another. In other words, the signals appearing at the two outputs of any stage will always be 180° out of phase. This is depicted by the output notation wherein $\bar{a}$ is equivalent to "not $a$" or the inverse of $a$, and similar meaning is ascribed to $\bar{b}$ and $\bar{c}$.

Hereinafter, if the two states of each stage are designated "1" and "0," when terminal $a$ is positive with respect to terminal $\bar{a}$, the state of the stage will be defined as "1" and when terminal $\bar{a}$ is positive with respect to terminal $a$, the state of the stage will be defined as "0." Physically, the "1" state corresponds to conduction of transistor 42 and nonconduction of transistor 41, and the "0" state corresponds to conduction of transistor 41 and nonconduction of transistor 42.

To understand the flip flop action, assume that transistor 41 is initially conducting and transistor 42 is initially nonconducting. Under these conditions, the stage is in a "0" state and the collector of transistor 41 is essentially at a voltage equivalent to that on conductor 40. This appears at output terminal $\bar{a}$. The collector of transistor 42 is near ground potential. This consequently appears at output terminal $a$. It will also be assumed that input terminal S is enabled by a voltage equivalent to that appearing on conductor 40 and that the input terminal R is approximately at ground potential. Furthermore, square waves are being applied to conductor 36.

Under the assumed conditions, the base of transistor 41 is at approximately zero volts with respect to its emitter and the anode of rectifier 56 is at the voltage level of conductor 40. The positive going portion of the square wave on conductor 38 is differentiated and transmitted through capacitor 58 and rectifier 56 to the base of transistor 41 rendering it nonconductive. On the other hand, diode 57 is reverse-biased at this time with a positive voltage on the cathode and approximately zero voltage on the anode, and the positive triggering pulse does not appear on the base of transistor 42. Due to the cross coupling of resistor 53 between the collector of transistor 41 and the base of transistor 42, when transistor 41 is cut off the attendant drop in the collector potential thereof turns transistor 42 on. The voltages on the outputs $a$ and $\bar{a}$ are now reversed and consequently, reflect the new state, "1," of the flip flop circuit.

Occurrence of succeeding square wave impulses on shift line 36 when the stage is in a "1" state and input terminal S is enabled does not modify the state because transistor 41 is already nonconducting. This follows expected operation because the flip flop circuit must always reflect the state of the preceding flip flop circuit as dictated by the input conditions on the S and R terminals.

The flip flop stages are interconnected to form a re-entrant shift register. Output terminals $a$ and $b$ are connected respectively to input terminals S and output terminals $\bar{a}$ and $\bar{b}$ are connected respectively to input terminals R of the succeeding stages. The output $c$, $\bar{c}$ of the final stage is re-entrantly connected by conductors 67 and 68 to terminals R, S of the first stage in an inverted fashion in order to reverse the state shifted therebetween.

Disregarding for the moment the intervening influence of the OR-AND logic gate combination appearing between the output of the first stage and the input of the second stage, it will be recognized that pulses are shifted from stage to stage in response to the application of shift pulses via conductor 36. It will be further noted that a "0" state in the third stage is invariably transferred to the first stage placing it in a "1" state. Eight possible permutations of states may arise in the shift register. In order to form a three-phase output, however, a maximum of six permutations is desired. It has been found that by including the OR-AND logic gate combination between the first and second stage, it is possible to avoid repetition of unwanted permutations and to re-cycle the re-entrant shift register circuit to provide successively six distinct permutations of the nature desired.

The combined OR-AND gate consists of an OR gate made up of rectifiers 61 and 62 and an AND gate made up of rectifiers 64 and 65. The inputs to the OR gate represent either a "1" condition in the second stage or a "0" condition in the third stage. These conditions are imposed by connecting the $b$ output of the second stage via conductor 71 to the anode of rectifier 62 and by connecting the $\bar{c}$ output of the third stage via conductors 68 and 69 to the anode of rectifier 61. In accordance with conventional and well understood OR gate operation, the output of the OR gate which appears at the cathodes of rectifiers 61 and 62 will be positive when either the second stage is in a "1" state or the third stage is in a "0" state. The output of the OR gate serves as one input to the AND gate. The other input to the AND gate is supplied from the "$a$" terminal of the first stage and the output of this gate is connected to the "S" input of the second stage. This configuration insures that a "1" state in the first stage will be transmitted to the second stage only if the second stage is already in a "1" state or the third stage is in a "0" state. In other words, an input appears on the S terminal of the second stage only when both inputs to the AND gate are positive.

As fully described in the aforecited patent application, if the signals on each output terminal of the modified register are considered, six rectangular waves are available on conductors 72, 73, 74, 75, and 76, each separated by 60° from its predecessor and successor in time. The repetition rate of these rectangular waves is one-sixth that of square wave generator 19. These outputs are connected in pairs to the power amplifier 12 associated with each individual phase, with the paired output of each stage supplying one power amplifier.

Power amplifier

The output of each stage of the modified shift register is individually amplified in power amplifiers 12. The function of the power amplifiers is to develop square wave signals of sufficient power and proper waveform to drive the modulator 14 appearing in FIG. 4. As shown in the power amplifier of phase 3, which is typical, four transistors 82, 83, 94, and 95, are used to develop two push-pull amplifying circuits.

The first push-pull amplifier comprises PNP transistors 82 and 83 having their emitters connected to the positive voltage on conductor 40. The collectors are connected to opposite ends of the primary 91–1 of transformer 91, the center tap of which is connected by resistor 78 to ground on conductor 38. By this connection, resistor 78 reduces the peak inverse voltage across transistors 82 and 83. Capacitor 79 filters the voltage at the center tap of primary winding 91–1. The output of the third stage of phase splitter 11 which appears on conductors 76 and 77, is applied to the bases of transistors 82 and 83 by coupling resistors 84 and 85 respectively. Reverse-bias is maintained on both transistors by resistors 86 and 87 connected between the positive source 20 on conductor 37 and the bases of transistors 82 and 83 respectively.

Because the output from the third stage of the modified shift register comprises square wave signals separated in phase by 180°, the transistors 82 and 83 are driven into conduction on successive half cycles producing current flow through respective halves of primary winding 91–1 during each half cycle, the current flow being in different directions and consequently producing a square wave output in secondary winding 91–2. Clamping means are provided to limit the magnitude of switching voltage spikes on the collectors of transistors 82 and 83. This clamping means is in the form of capacitor 80 and diodes 88 and 89 which are connected between positive voltage conductor 40 and each end of primary winding 91–1. Resistor 81 provides a path to discharge capacitor 80.

In operation, if it be assumed that a positive signal is present on terminal $c$ of phase splitter 11, terminal $\bar{c}$ will have a relatively negative voltage thereon. These signals are applied to transistors 82 and 83, rendering transistor 82 nonconductive and transistor 83 conductive. During conduction, a circuit path exists including conductor 40, transistor 83, the upper half of transformer primary winding 91–1, resistor 78, and ground. In accordance with the "dot" notation current flow in this direction results in inducing a positive voltage at the dotted terminal of secondary winding 91–2. During the succeeding half cycle of output from the third stage of phase splitter 11, transistor 82 is rendered conducting and the current flow is from positive conductor 40 through the lower half of transformer primary 91–1, resistor 78, and ground. In this instance, the positive voltage is induced at the undotted terminal in secondary winding 91–2. Clamping rectifiers 88 and 89 cause capacitor 80 to charge negatively with respect to conductor 40 to a voltage approximately equal to the average voltage of the square wave. Switching voltage spikes caused by the inductive reactance of transformer 91 are limited by clamping rectifiers 88 and 89 so that they can not descend below the voltage on capacitor 80.

Figure 4:
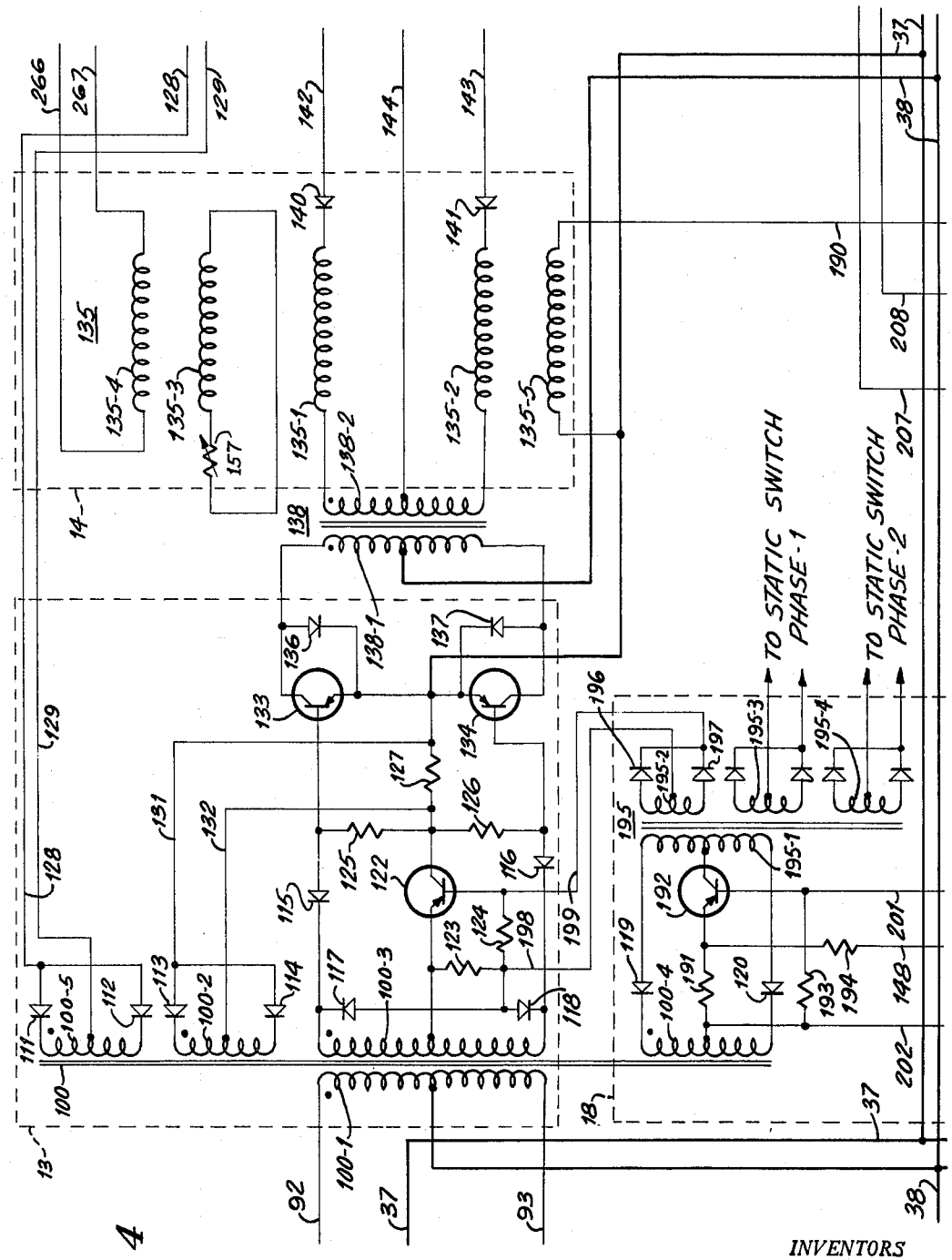

Transformer 91 is the input transformer of a second push-pull amplifying stage comprising PNP transistors 94 and 95. The secondary winding 91–2 of transformer 91 has the end terminals thereof connected to the base electrodes of the aforementioned transistors and its center tap is connected via resistor 96 to a common emitter connection. The emitters are held under a forward-bias condition by resistor 99 connected to positive voltage source 20 via conductor 37. The collectors of transistors 94 and 95 are each connected to an end terminal of primary winding 100–1, the center tap of which is connected to ground as shown in FIG. 4.

Without further explanation, it will be recognized that transistors 94 and 95 are alternately rendered conductive in response to the square wave supplied by the secondary winding 92–2 and produce an energizing voltage in primary winding 100–1 of output transformer 100 that is a square wave with relatively steep rise and fall time.

As indicated, the outputs of the first and second stages of phase splitter 11 are similarly amplified and appear on terminals 103, 104, 105, and 106. As the schematic illustrates, the outputs of the push-pull amplifiers in phase 2 are inverted. As a result, the signal appearing therefrom is 180° out of phase with the original input from phase splitter 11. This inversion yields, at the output of the power amplifiers, the three phase signal desired, wherein each phase is separated by exactly 120°.

It will be recognized that the function of the power amplifiers 12 is merely to provide a proper signal for driving modulators 14. The power amplifiers may be eliminated by increasing the energization level of each stage of the shift register in phase splitter 11 and using the outputs thereof directly. For example, the output of each shift register stage might be used directly to drive transformer 100. This alternative circuit arrangement would perhaps be further expedited by increasing the power of the shift pulse applied on conductor 36 to the shift register and this, of course, could be easily done by adding amplification following the amplifier comprising transistor 29 in FIG. 2.

Static switch

Each phase has a static switch 13 serially interconnected therein and responsive to various controls to either transmit driving signals from power amplifier 12 to the output stages, or remove the driving signals. Control over static switch 13 is exercised by common protection circuit 18, which is discussed hereinafter. For the present, it will be assumed that switch 13 is maintained in an "on" condition and that it therefore transmits the necessary signals to the output stages.

Considering the third phase, as typical, transformer 100 transmits the output of power amplifier 12 to static switch 13. This transformer consists of a single primary winding 100–1 inductively coupled to four center tapped secondary windings 100–2, 100–3, 100–4, and 100–5. Secondary windings 100–2 supply power to the switching circuit; secondary windings 100–3 provides switching impulses to the switching circuit; secondary windings 100–4 provide switching impulses for a portion of protection circuit 18; and secondary windings 100–5 supply power to output stage 15 (described hereinafter).

The basic elements of switching circuit 13 are a PNP switching transistor 122 and push-pull connected PNP transistors 133 and 134. Transistor 122 is connected to enable the push-pull amplifier when it is conducting and to disable it when it is nonconducting. Normally, transistor 122 is maintained conducting and only during "start-up" or overload, as explained hereinafter, does the protection circuit 18 operate to render it nonconductive.

Center-tapped secondary winding 100–2 in conjunction with rectifiers 113 and 114 provides a direct voltage for normally biasing transistors 133 and 134 to a non-conducting state. These rectifiers full-wave-rectify the voltage induced in secondary winding 100–3 and produce a positive voltage difference between conductors 132 and 131. Conductor 131 is connected to the emitters of transistors 133 and 134 and conductor 132 is connected to their bases via resistors 125 and 126, respectively. Thus, a negative bias appears between the emitter and base electrodes of each transistor.

The main control signal path for the output from power amplifier 12 is via center-tapped transformer secondary winding 100–3. The end terminals of winding 100–3 are connected by suitably oriented rectifiers 115 and 116 to alternately supply relatively negative biasing potential to the base electrodes of transistors 133 and 134 to render them conductive. The center-tap of winding 100–3 is connected via the emitter-collector path of transistor 122 and resistor 127 to a common junction point between the emitters of transistors 133 and 134, thereby providing a positive control over the conduction path of transistors 133 and 134 in accordance with the conduction state of transistor 122. Forward-biasing potential between the emitter and collector of transistor 122 is present due to the connection of the anodes of rectifiers 115 and 116 via resistors 125 and 126, respectively, to the collector of transistor 122. The base of transistor 122 is held normally negative with respect to the emitter by a resistor 124 connected to the anode junction of rectifiers 118 and 117. These rectifiers are arranged anode-to-anode across winding 100–3. A resistor 123 interconnects the center tap of transformer secondary 100–3 and the junction between diodes 117 and 118 thereby providing a voltage difference between the emitter and base electrodes of transistor 122.

During a normal cycle of operation, when the dotted terminal of primary winding 100–1 is driven positive by the output of power amplifier 12, a positive voltage appears on the upper terminal of secondary winding 100–3 and a negative voltage appears on the lower terminal thereof. The negative voltage is applied through rectifier 118 and resistor 124 to the base of transistor 122 and a relatively positive voltage is delivered from the center tap of transformer secondary 100–3 to the emitter thereof. The collector electrode has a negative potential applied by the path including rectifier 116 and resistor 126. The magnitudes of the respective voltages render transistor 122 conductive and thereby establish a low impedance path from the emitter to the collector.

The orientation of diodes 115 and 116 connected to winding 100–3, results in the application of the negative voltage appearing at the lower terminal thereof to the base of transistor 134. This negative voltage overcomes the reverse-bias from secondary winding 100–2 and transistor 134 switches to a conducting state. As mentioned, transistors 133 and 134 are connected as a push-pull amplifier. The emitters are connected in common to positive voltage conductor 37 and the collectors are interconnected through center-tapped primary 138–1 of output transformer 138, the center tap being connected to grounded conductor 38. A pair of diodes 136 and 137 shunt the emitter-collector paths of transistors 133 and 134 respectively and are oriented to provide a low impedance path for inverse voltages. In view of the described connections, conduction of transistor 134 provides a current path through the lower half of primary 138–1 comprising positive voltage conductor 37, transistor 134, the lower half of winding 138–7, and grounded conductor 38. Energization of transformer 138 in this manner provides the drive for the modulator 14.

The described operation of switch 13 was in response to the application of a positive voltage at the dotted primary terminal of transformer 100. The output from power amplifier 12 is, in fact, rectangular in form, and consequently the assumed condition represents one half cycle. During the succeeding half cycle, transistor 122 is again rendered conductive. This time, however, transistor 133 of the push-pull pair is switched to conduction and consequently, the upper half of transformer primary 138–1 is subjected to current.

On alternate half cycles, the energizing current in transformer primary 138–1 is in opposite directions. Obviously, this results in inducting voltages in center-tapped secondary 138–2 that alternate in polarity and may be described as rectangular. This is the voltage used to drive modulator 14, which is a magnetic amplifier furnishing pulse-duration-modulated control signals to the switching transistors of the output inverter stage 15.

Pulse width modulator

In accordance with well known static inverter technique, by controlling the period of conduction of the output stages, it is possible to control the magnitude of output power delivered. The illustrated circuit uses a magnetic amplifier 135, of the type commonly termed "amplistats," to develop pulse-width controlled signals. As shown, magnetic amplifier 135 is connected to supply the gating impulses which turn on the inverter output transistors.

The operation of magnetic amplifier 135 is conventional. When power is first applied to transformer 138 upon commencement of each half cycle, the voltage induced in secondary 138–2 causes a magnetizing current to flow in one of the gate windings 135–1 or 135–2. The magnetizing current is of low magnitude due to the relatively high impedance of the windings when the magnetic core thereof is unsaturated. Upon saturation of the core, the impedance of the gate windings rapidly drops and a large current flow ensues. By controlling the initial state of magnetic saturation, it is possible to control the moment at which saturation occurs and consequently, to control the moment at which the large current flow commences. As described hereinafter, the "firing," at the time of saturation, controls the switching of the output stage 15.

The gating windings 135–1 and 135–2 of the magnetic amplifier are connected to opposite ends of center-tapped secondary windnig 138–2. Rectifiers 140 and 141 in series with resistors 150 and 151 respectively, interconnect the free ends of gate windings 135–1 and 135–2 respectively, to the center tap of secondary 138–2. Rectifiers 140 and 141 are oriented to permit current flow through gate winding 135–2 when a positive voltage appears on the dotted terminal of secondary 138–2 and to permit current to flow through gate winding 135–1 when a negative voltage appears on said dotted terminal.

Three control windings, 135–3, 135–4, and 135–5, bias the core of magnetic amplifier 135 and thereby effect the duration preceding "firing." Control winding 135–3, shunted by a variable resistor 157, provides stabilization of the magnetic amplifier; control winding 135–4, controlled by voltage regulator 16, modifies the bias of the magnetic amplifier in accordance with the load; and control winding 135–5, controlled by protection circuit 18, biases the magnetic amplifier to a cut-off condition during "start-up" or overload. The development of current in control windings 135–4 and 135–5 will be specifically considered in the following sections dealing with voltage regulating circuit 16 and protection circuit 18. Here, it need merely be understood that at pre-selected intervals following commencement of each half cycle of driving signal, enabling current is furnished to output stage 15. This enabling current alternately appears on conductors 142 and 143.

Output stage

The key elements in output stage 15 are PNP switching transistors 155 and 156. Their function is to alternately connect the positive voltage supply appearing on conductor 37 to opposite ends of primary 160–1 of output transformer 160, thereby producing an alternating current in secondary winding 160–2. Transistors 155 and 156 are operated in the switching mode in order to keep losses at a minimum and to obtain high efficiency. It should be understood that although only a single transistor is shown in each half of the stage, in order to increase the power capacity, additional transistors may be added in parallel with those illustrated.

Transistors 155 and 156 are normally maintained in a nonconducting condition with a full-wave-rectified voltage developed from the output of secondary winding 100–5 of transformer 100. Rectifiers 111 and 112 are connected to secondary winding 100–5 to provide a positive voltage difference between conductors 129 and 128. The former conductor is tied to the center-tap of secondary 100–5 and the latter conductor is connected to the anodes of rectifiers 111 and 112. This bias voltage is applied across a resistor 152 which is interconnected between the center tap of transformer secondary 138–2 and a common emitter connection between transistors 155 and 156. The actual reverse-biasing path for transistor 155 comprises resistors 150 and 153, the base-emitter junction of transistor 155, and resistor 152. For transistor 156 the reverse-biasing path comprises resistors 151 and 154, the base-emitter junction of transistor 156, and resistor 152.

The output is extracted from the switching transistors by connecting their collectors to opposite ends of output transformer primary 160–1. The center-tap of primary winding 160–1 is connected to grounded conductor 38 and the common emitter connection between transistors 155 and 156 is connected via windings 162 of inductor 158 to the positive conductor 37. Thus, conduction of either transistor is effective to establish a low impedance path through one-half of primary winding 160–1. The particular transistor conducting determines which half of the primary is energized and consequently, the relative polarity of the voltage induced in secondary 160–2.

When large power factor variations occur in the load, the current through transistors 155 and 156 may no longer be in phase with the voltage across them. In order to obtain an optimum switching pattern which yields minimum power dissipation, rectifier 163 in conjunction with dual winding inductor 158 is connected between the common emitter junction and the center-tap of primary 160–1. The direct voltage between conductors 37 and 38 thus appears across rectifier 163 and portion 161 of inductor 158.

Inductor 158 is part of the output filter consisting of inductor 158 and the parallel tuned tank circuit comprising output secondary 160–2 and capacitor 157. The exciting reactance of transformer 160 is tuned to resonance at the fundamental frequency by capacitor 157. Thus, the tank presents a high impedance to the fundamental frequency and a low impedance to the harmonics; the harmonics being absorbed across inductance 158.

The effect of dual winding inductance 158 will be appreciated by considering a sine wave output under several load conditions.

Assume a square wave drive from modulator 14 with a unity "on" to "off" time and unity power factor load with no phase shift between the square wave input from modulator 14 and the sine wave output at transformer secondary 160–2. Under these conditions, there is a rectified sine wave across transformer primary 160–1 and the voltage across portion 162 of inductor 158 will be the difference between the direct voltage supply and the rectified sine wave. Because the average voltage across inductance portion 162 must be zero, a definite relationship of 1:1.57 exists between the magnitude of direct voltage source 20 (as it appears between conductors 37 and 38) and the peak voltage of the rectified sine wave. This relationship holds regardless of load or size of inductance portion 162; therefore, there is no attenuation with the real load assumed.

If the tank circuit, secondary 160–2 and capacitor 157, is detuned, or if the load is reactive, the rectified sine wave in transformer primary 160–1 will be phase shifted in relation to the input square wave. In this case, the sine wave peak will exceed the above mentioned relationship in order to satisfy the requirement that the average voltage across inductance portion 162 be zero.

The function of inductive portion 161 and rectifier 163 may be seen by assuming a ratio of "on" to "off" time of the modulator 14 drive to be 2:3. Assume inductance 161 is twice as large as inductance 162. In this case, the peak of the rectified sine wave across primary 160–1 will be 0.9 times the magnitude of direct voltage source 20. The relatively continuous current flow required in inductance 158 by its reactive characteristic necessitates a discharge path during the period when neither transistor 155 or 156 is conducting. This path comprises inductance portion 161, rectifier 163, and conductors 38 and 37 and direct voltage source 20. For maximum operation efficiency, it is found that an inductance ratio of 2:1 for inductance 161 to inductance 162 is desirable. This minimizes the peak inverse voltages applied across the switching transistors 155 and 156 and does not interfere with inverter operation.

It has been shown that inductor 158 serves a necessary purpose in reducing the peak inverse voltage of transistors 155 and 156 to a minimum. Rectifiers 164 and 165 also serve in this capacity. They are connected between taps on primary winding 160–1 and positive conductor 37 and function to limit the rectified sine wave peaks during transients such as occur when changing loads. For example, the taps on primary winding 160–1 may be chosen to limit the sine wave peaks at 10% above the nominal value. Actually, the waveshape is not noticably clipped at its peaks, but enough power is extracted from the output stage to limit the voltage.

Taking into effect the functioning of each of the elements of the inverter output stages 15, the result is to furnish a single phase sine wave at the output of each phase chain that is 120° displaced in phase from that of each other chain. These outputs appear on secondary windings corresponding to winding 160–2. An additional secondary winding 160–3 also appears. Its function, along with corresponding windings 360–3 and 460–3, from the other phases, is to reduce triplet harmonics and insure 120° phase balance between the output voltages.

Secondary windings 160–3, 360–3, and 460–3 are connected in a delta configuration by placing them in a series loop with additive polarity. The closed loop insures that the sum of the three phase fundamental line-to-neutral voltages are equal to zero. Further, individual voltage regulators 16, as described subsequently, regulate the three line-to-neutral voltages to keep them all equal. The only voltages satisfying these conditions are exactly 120° apart. The triplet harmonics, notably the third, are also reduced because the third harmonics add cumulatively around the loop and are effectively shorted from the output. These harmonics appear across inductor 158 and its counterpart in each phase.

The preceding material has described in detail the circuit components and operation involved in developing one phase output of a three phase inverter. In order to insure stability of output and reliability of operation, a voltage regulator 16 and a protection circuit 18 are included. One function of protective circuit 18 is to protect the circuit during the initial start-up of the inverter, this will be considered first.

*Protection circuit—"start-up"*

Many stable frequency sources require a finite period of time in order to build up to their rated output frequency and power. When used to control inverters, such as here disclosed, it is necessary to isolate the output circuitry from the driving circuitry during the build-up period in order to prevent excess over-currents or over-voltages which could destroy them. The righthand portion of protection circuit 18 in FIG. 6 functions to establish this isolation of the output stages.

The "start-up" circuitry comprises a time delay means including unijunction transistor 177 and several switching transistors 181 and 182, the function of which is to open switching circuit 13 and disable modulator 14 during a predetermined period immediately following application of direct voltage to the inverter system. Unijunction transistor 177 is connected in a time delay circuit similar to that disclosed in patent application Serial No. 100,246, now Patent No. 3,126,516, filed April 3, 1961, by L. R. Peaslee and assigned to the assignee of the present invention. As described therein, means are provided for triggering a unijunction transistor into conduction a predetermined interval of time following application of a voltage thereto. Once the unijunction transistor is established in a conducting state, it remains in that state until the applied voltage is removed from the input thereof.

As shown in FIG. 6, unijunction transistor 177 has its bases connected between positive supply conductor 37 and grounded conductor 38, with resistor 178 interposed between the upper base and positive supply conductor 37. The emitter of unijunction transistor 177 is connected to a voltage divider arrangement comprising resistor 174, Zener diode 176, and resistors 180 and 187, which is connected between positive conductor 37 and grounded conductor 38. The connection between the voltage divider and the emitter is established by a rectifier 175 connected to provide a positive voltage on the emitter when the voltage thereon is lower than the junction between resistor 174 and Zener diode 176. Zener diode 176 is in a reverse bias orientation in the voltage divider circuit and the component values of the resistors in this circuit are selected to provide sufficient voltage to break down the diode under normal conditions. The component values are further selected so that the emitter to base potential is sufficient to sustain conduction of unijunction transistor 177 once started, but is insufficient to initially switch it into conduction.

A triggering circuit is provided that is operative a predetermined time after application of direct current to the inverter circuit to provide a triggering voltage on the emitter of transistor 177. This triggering circuit comprises resistor 167 and capacitor 168 serially connected between positive conductor 37 and grounded conductor 38. The junction between resistor 167 and capacitor 168 is connected by rectifier 170 and resistor 172 directly to the emitter of unijunction transistor 177, with rectifier 170 being oriented to pass positive voltage to the emitter. Thus, when the voltage on capacitor 168 reaches triggering potential, unijunction transistor 177 is switched into conduction. A clamping diode 169 bridges resistor 167 in order to maintain the upper terminal of capacitor 168 at a level no greater than that of the supply voltage. An additional capacitor 171 interconnects the junction between diode 170 and resistor 172 to ground. The function of capacitor 171 is to insure that initially the emitter of the unijunction transistor 177 does not rise as rapidly as the base voltages and thereby cause false triggering before the selected time interval has elapsed.

Under normal conditions, when direct current is applied to the inverter circuit, unijunction transistor 177 is energized in the series circuit including resistor 178. Transistor 177 is not initially conductive because the voltage applied to the emitter thereof via rectifier 175 is insufficient to switch it. Following the preselected time interval, which may be, for example, 500 milliseconds, the voltage on capacitor 168 charges to the triggering level of transistor 177 causing it to switch and provide a low impedance discharge path through its emitter-base junction. The discharge path comprises capacitor 168, rectifier 170, resistor 172, the emitter-base junction of unijunction transistor 177 and grounded conductor 38. Discharge of capacitor 168 would, under normal circumstances, result in unijunction transistor 177 once again assuming a nonconducting state; however as described in the aforecited L.R. Peaslee sole application, Serial No. 100,246, current is supplied in the path from positive conductor 37 through resistor 174 and diode 175 to maintain the unijunction transistor in a conductive state until removal or failure of the direct voltage supply. Thus, unijunction transistor 177 is enabled a predetermined time following application of direct voltage and remains conducting as long as the direct current source is applied.

Transistor 181 controls the condition of static switch 13 in response to the state of unijunction transistor 177. When unijunction transistor 177 is in a nonconducting state, transistor 181 is forward-biased and operates to maintain the static switches 13 opened. Once the predetermined warm-up time has elapsed and unijunction transistor 177 is switched into conduction, transistor 181 is reverse-biased and operates to close static switches 13, permitting normal functioning of the inverter. NPN transistor 181 has its emitter connected to grounded conductor 38 and its collector connected through resistor 183, conductor 201, resistor 193, and conductor 202 to positive conductor 37.

It has been mentioned that transistor 181 controls the static switches 13. This is accomplished by means of a static switch that is an integral part of protection circuit 18. This switch appears in the lower left quadrant of FIG. 4. Its function is to develop a reverse-bias to render switching transistor 122 and its counterparts in phases 1 and 2 nonconductive whenever transistor 181 is conductive. As in the case of the static switches 13 associated with each phase, the protection circuit switch is developed around a switching transistor 192. When this transistor is forward-biased the switch is "closed" and reverse-biasing potential is applied to the static switches 13, and when it is reverse-biased, the switch is "open" and no external bias is applied to the static switches 13.

As shown, PNP transistor 192 is supplied by the center-tapped secondary winding 100-4 of the output transformer associated with the output of the third phase power amplifier 12. It will be recalled that the output of power amplifier 12 induces a square wave in the secondary windings of transformer 100. Rectifiers 119 and 120 interconnect the end terminals of secondary winding 100-4 to the end terminals of center-tapped primary winding 195-1 of transformer 195, and are oriented to pass current when the associated terminals of secondary winding 100-4 are negative. The center taps of secondary 100-4 and primary winding 195-1 are interconnected by a series circuit comprising a small resistance 191 and the emitter-collector path of transistor 192. Thus, in order to transmit current from secondary winding 100-4 to the primary winding 195-1, transistor 192 must be in a conducting state. When it is in a conducting state, a low impedance path exists between the respective halves of secondary 100-4 and primary 195-1 and a square wave is transmitted to the primary winding. This energizing square wave is effective to induce a similar square wave in secondary windings 195-2, 195-3, and 195-4 of transformer 195. The induced square wave is rectified by rectifiers 196 and 197 for application as a reverse-biasing potential to transistor 122.

Specifically, secondary 195-2 has end terminals connected through rectifiers 196 and 197 to develop a positive voltage on conductor 199 with respect to the center tap. By interconnecting the center-tap via conductor 198 and resistor 123 to the emitter of transistor 122 and by connecting conductor 199 to the base thereof, a reverse voltage is applied which will render transistor 122 nonconductive. Similar rectifying circuits connected to secondary windings 195-3 and 195-4 control the static switches 13 in phase 1 and phase 2.

Obviously, the static switches 13 must be closed in order to supply driving power to the output stages 15.

Thus, the common static switch in protection circuit 18 must normally be nonconducting. This state is achieved by connecting the emitter of PNP transistor 192 to grounded conductor 38 via resistance 194 and conductor 148, and the base thereof to positive conductor 37 via resistance 193 and conductor 202. A normal reverse-bias is thereby created which is only overcome during "start-up" or "overload" as evidenced by conduction of transistor 181; conduction of transistor 181 occuring only under the mentioned conditions.

A recapitulation of the sequence of the circuit conditions indicates that during the warm-up period, transistor 122 is maintained in a nonconductive state by a positive output from the common static switch comprising transistor 192. This condition is removed and static switch 13 assumes a closed condition once the warm-up period has elapsed. As will be described shortly, in the event the output current becomes excessive for a period of time deemed dangerous, additional means are provided for disabling transistor 122 and once again separating the input drive from the power stages of the inverter.

Still another element of protection is provided to prevent generation of an inverter output before the driving circuitry has attained stable operation. This protection involves biasing magnetic amplifier 135 to prevent firing until stability occurs. A transistor 182, on the right side of FIG. 6, is serially connected with control winding 135–5 and corresponding control windings in phases 1 and 2, between positive conductor 37 and grounded conductor 38. When transistor 182 is conducting the current flow through the control windings develops sufficient magnetic bias in the magnetic amplifier cores to prevent them from firing. NPN transistor 182 is controlled in the same fashion as control transistor 181. During "start-up" it is in conduction, and following warm-up, a negative voltage from unijunction transistor 177 biases it into nonconduction.

The series circuit connecting transistor 182 between positive conductor 37 and grounded conductor 38 comprises: control winding 135–5, resistor 184 and the collector-emitter junction thereof. Resistors 188 and 189 interconnect the control windings of phases 1 and 2 in parallel with control winding 135–5. A rectifier 185 is connected between the collector of transistor 182 and positive conductor 37 to prevent reverse-current in the control windings. The state of unijunction transistor 177 controls transistor 182 via the voltage divider comprising resistor 174, Zener diode 176, resistor 180, and resistor 187; the junction between the latter resistors being connected to the base of transistor 182.

*Protection circuit—overload*

In the event the output current in any phase or each phase, exceeds a predetermined value for an excess period of time, thereby threatening to injure the equipment, protective circuit 18 opens the switches 13. The circuitry which provides this protection appears on the lefthand side of FIG. 6.

A center-tapped current transformer 203 appearing, for example, in the output of the third phase in FIG. 5, is used to monitor the magnitude of current flow therein. The current amplitude is converted to a direct voltage by connecting resistor 204 across transformer 203 and by connecting rectifiers 205 and 206 as a full wave rectifier across resistor 204. This circuit configuration provides a positive direct voltage between the cathodes of the rectifiers and the center-tap of transformer 203. Conductors 207 and 208 apply this voltage to a capacitor 213 and the base electrode of PNP transistor 214 in FIG. 6. Capacitor 213 is used for filtering purposes and the positive voltage appearing on its upper terminal is effective to supply the overload protection circuitry. Transistor 214, as will be developed, is part of a monostable multivibrator used for establishing a reliable pulse for controlling the overload circuitry's timing.

The protection circuitry is responsive to a predetermined positive voltage difference between conductors 208 and 207 to begin timing. At the elapse of the preselected time, a signal is applied to control transistor 181 which is effective to close the common static switch comprising transistor 192 and thereby open all static switches 13.

In general, the protection circuitry comprises a monostable multivibrator consisting of normally conducting PNP transistor 215 and normally nonconducting PNP transistor 214. When an excessive current condition exists, transistor 214 is rendered conductive and the resulting signal therefrom is applied to charge a timing capacitor 229. Capacitor 229 charges until it attains the triggering voltage of a unijunction transistor 238. Unijunction transistor 238 is thereupon triggered into a conducting state and a signal is applied to normally conducting transistor 243 rendering it nonconductive. Cutoff of transistor 243 generates a positive voltage which switches control transistor 181 into conduction, and in accordance with the previously described circuit functioning, this causes the isolation of the driving stages from the output stages 15 by opening static switches 13.

Considering the specific circuitry, it will be seen that the monostable multivibrator comprising transistors 214 and 215 is connected to a positive potential on conductor 200 via Zener diode 226. Resistor 221 shunts Zener 226 in order to reduce the required wattage rating thereof. Conductor 200 is tied to the positive rectified output voltage by conductor 208 and to the positive conductor 37 by a resistance 212. Transistor 214 is biased to nonconduction by a voltage divider consisting of resistors 216, 223, and 225 serially connected between conductor 200 and grounded conductor 38; the junction of resistors 216 and 223 being connected to the base thereof. Transistor 215 is biased into conduction by a voltage divider consisting of resistor 217, rectifier 212, and resistor 219 serially connected between conductor 200 and ground; the junction between resistor 217 and rectifier 212 being connected to the base thereof. The collector of transistor 214 is connected by load resistor 218 to grounded conductor 38 and the collector of transistor 215 is connected by resistor 225 to ground. The base of transistor 214 is coupled to the collector of transistor 215 by resistor 223 in parallel with a filter capacitor 222, and the base of transistor 215 is connected to the collector of transistor 214 via rectifier 212 and a timing capacitor 224. The voltage breakdown, or Zener, diode 226 interconnecting conductor 200 and the common emitter connection provides a reliable voltage reference level for the multivibrator.

The circuit parameters are chosen to establish conduction of transistor 215 in the current path comprising conductor 200, Zener 226, the emitter and collector of transistor 215, resistor 225, and grounded conductor 38. While transistor 215 is conducting, transistor 214 is biased to nonconduction due to the voltage divider action of resistor 216 and coupling resistor 223. Reversal of this state occurs only when the output current is excessive. When an overload producing a voltage in excess of that appearing across reference diode 226 is experienced, transistor 214 is triggered into conduction by the negative voltage on conductor 207 connected to the center tap of current transformer 203 and its counterparts in other phases.

When rendered conductive, transistor 214 is effective to cut off transistor 215. This occurs as the voltage on the collector of transistor 214 rapidly moves positive, driving the base of transistor 215 positive. The result of such triggering is to produce a positive pulse at the collector of transistor 214 having a duration determined by the magnitude of capacitor 224. This, for example, may be one half cycle of the output from an individual phase. Upon termination of this period, capacitor 224 is discharged and transistor 214 is once again rendered nonconductive. The positive voltage on the collector will consequently be terminated.

An important feature of the invention resides in the operation of the above-described monostable multivibrator. Whenever an overload condition occurs, whether it be in only one phase or in all phases, a constant duration signal is generated by the monostable circuit which may be used to activate further timing circuits with reliability. If an overload occurs on more than one phase at a time, additional triggering voltages will be applied to maintain the transistor 214 conducting, and this increases the voltage used to actuate subsequent timing circuits. If the overload is excessive and current transformer 203 is saturated, the output therefrom will perhaps degenerate into a "spike," nevertheless, this will be sufficient to trigger the multivibrator and still furnish a good signal for subsequent timing circuits.

To insure that a detected overload condition is of sufficient magnitude to injure the equipment if not disconnected, it is necessary to provide further timing circuits to discriminate between temporary overloads and dangerous overloads. A unijunction transistor timing circuit, similar to that described in connection with "startup," serves to fulfill this requirement.

The positive voltage generated at the collector of transistor 214 when an overload occurs, is used to charge a timing capacitor 229 for triggering unijunction transistor 238. The charging path for capacitor 229 includes a resistor 227 and rectifier 228. When the voltage on capacitor 229 achieves the predetermined cut-on potential of unijunction transistor 238, it discharges in the path comprising a rectifier 232, the emitter and lower base of unijunction transistor 238 and ground.

The timing circuit comprises unijunction transistor 238 connected in series with resistor 239 between conductor 220 and grounded conductor 38. Conductor 220 is at a positive potential slightly less than conductor 200 due to voltage regulating diode 226 which interconnects them. Normally, the unijunction transistor is nonconducting, however, an emitter voltage is applied which sustains conduction once the circuit is triggered due to overload. The emitter voltage is derived from a voltage divider between conductor 220 and grounded conductor 38. The divider comprises resistor 236, Zener diode 237, resistor 241, and resistor 242. The emitter is connected thereto by rectifier 235. Elimination of false triggering during initial energization is provided by serially connecting resistor 233 and capacitor 234 between the emitter and grounded conductor 38.

When the above described monostable multivibrator remains switched for a sufficient period of time to charge capacitor 229 to the triggering potential of unijunction transistor 238, the transistor is triggered into conduction. Once conduction starts, it is sustained by current from conductor 220 via resistor 236 and rectifier 235 to the emitter. Such conduction is consequently indicative of trouble and is used to initiate disconnection of the driving stages from the output stages 15. Normally conducting NPN transistor 243 translates the conduction of unijunction transistor 238 into a signal for control transistor 181 which in turn causes the opening of the static switches 13.

Transistor 243 is connected as an amplifier having a load resistor 244 connecting the collector thereof to conductor 220 and receiving base bias in a circuit comprising resistors 236, Zener diode 237, resistor 241, and resistor 242, serially connected to ground conductor 38. Zener diode 245, having its cathode connected to the collector of transistor 243 and its anode connected to conductor 246, interconnects the voltage appearing on the collector of transistor 243 to the base of control transistor 181. Due to the polarization of Zener diode 245 the near zero potential normally appearing on the collector of conducting transistor 243 is isolated from the base of transistor 181; however, when transistor 243 is rendered nonconductive, the collector immediately becomes sufficiently positive to break down rectifier 245 and transmit a positive pulse over conductor 246 to the base of transistor 181.

When unijunction transistor 238 conducts, a negative pulse is applied to the base of transistor 243, rendering it nonconducting.

Control transistor 181 is of the NPN variety, and therefore, the positive impulse applied to its base via conductor 246 is effective to render it conductive and this in turn, as previously described, places the common static switch comprising transistor 192 in a conducting state. Also, as previously described, the effect of energizing the common switch is to turn off the static switches 13 in each individual phase. Thus, the effect of a fault in any phase is to initiate a timing interval after which static switches 13 disconnect the driving stages from the output stages of the inverter.

*Voltage regulation*

The present invention utilizes separate but identical voltage regulators for each output phase. The voltage regulator associated with the third phase is shown in FIG. 5. In the illustrated circuit, regulation is obtained by rectifying the output voltage, comparing it with a standard, and supplying current to a control winding of the magnetic amplifier modulator 135 in accordance with the difference between the rectified output voltage and the standard. In this way, the width of the switching pulses delivered to output stages 15 is modified, and consequently, the power delivered is modified.

Voltage regulator transformer 250 has its primary windings 250-1 connected across the output of the third phase. The secondary windings 250-2 are connected to a full wave rectifying bridge 251, the output of which is filtered by series inductance 252 and shunting capacitor 253. The rectified output is then applied to the end terminals of voltage adjusting potentiometer 254. These connections provide a direct current potential across potentiometer 254 having a magnitude determined by the magnitude of the alternating current output. This direct current potential is compared with the voltage developed across a pair of voltage regulating diodes 255 and 256, and used to control the conduction of NPN transistor 261. Transistor 261 is in series with control winding 135-4 and thus determines the current flow therethrough. Adjustment of the slider position on potentiometer 254 is effective to control the degree of amplification of transistor amplifier 261 and consequently, controls the current in control winding 135-4.

Considering the specific circuit connections in the voltage regulator, control winding 135-4 of the modulating magnetic amplifier 135 is connected in series with conductor 266 and resistor 265 to the positive terminal of potentiometer 254. The other terminal of control winding 135-4 is connected via conductor 267, an inductance 263, the collector-base junction of NPN transistor 261, and the Zener diodes 255 and 256 to the slider on potentiometer 254. The emitter of transistor 261 is connected through current limiting resistor 260 to the negative terminal on potentiometer 254. A protective rectifier 259 is connected between the emitter and base of transistor 261 in order to limit the inverse voltage applied thereacross, and a variable resistor 257 is serially connected with a capacitor 258 between the collector and base electrodes of transistor 216 to provide an adjustable alternating current gain control. A filter capacitor 264 is connected from the collector of transistor 261 to one terminal of the control windings on conductor 266 in order to by-pass A.-C. voltages which may appear across the control winding 135-4. A ground connection to the base of transistor 261 is supplied by grounded conductor 38 and positive voltage is applied to the slider of voltage adjustment potentiometer 254 via a resistance 269 which is connected to positive conductor 37.

The supply voltage from D.-C. source 20 in FIG. 2, is applied between conductors 37 and 38 to cause breakdown to voltage regulating diodes 255 and 256, establishing a reference voltage thereacross. The output from the third phase, as previously described, establishes a direct current voltage across potentiometer 254 which effectively provides a positive voltage to the collector of transistor 261 and a negative voltage to the emitter thereof with respect to the grounded base. Transistor 261 conducts in accordance with the magnitude of this voltage. Voltage adjust potentiometer 254 is adjusted until the output of the third phase exhibits the desired magnitude. It will be seen that at this time the reference voltage appearing across regulating diodes 255 and 256, in combination with the rectified output of the third phase, biases transistor 261 to a state of equilibrium and that the current through control winding 135–4 properly saturates the core of the magnetic amplifier 135 to maintain this equilibrium.

Increase in output voltage causes a greater positive bias potential between the collector and base electrodes and between the base and emitter electrodes of transistor 261. Consequently, this transistor passes a larger current. The increased current flows through control winding 135–4 which is wound to decrease the conducting period of magnetic amplifier 135 in accordance with increasing current magnitude. The power delivered is thus decreased. In the event the power at the output of the third phase decreases, the biasing voltages applied to transistor 261 similarly decrease, less current flows through control winding 135–4, and the driving signal is applied for a longer period of time to the inverter output stage 15. Therefore, variations in output amplitude are corrected in accordance with the degree of the deviations from the reference voltage developed across Zener diodes 255 and 256.

A plurality of sub-circuits have been disclosed. These sub-circuits in combination, yield a greatly improved static inverter. The resulting inverter provides well-balanced and closely regulated three-phase power at a frequency that may be controlled accurately by using a crystal oscillator frequency source. Protective circuitry is also included to prevent either spurious outputs at start-up, or equipment damaging overloads.

The above-described circuitry constitutes a particular embodiment of this invention. It will, of course, be understood that it is not wished to be limited thereto since modifications can be made both in the circuit arrangement and in the instrumentalities employed and it is contemplated in the appended claims to cover any such modifications as fall within the true spirit and scope of the invention.

What is claimed as new and desired to be secured by Letters Patent of the United States is:

1. An inverter circuit for converting power from a direct voltage source of an alternating voltage comprising in combination, output switching means operative in response to switching signals to produce alternating current in a load by alternately connecting opposite terminals of said direct voltage source thereto, magnetic amplifier means responsive to control signals to produce duration-modulated switching signals for application to said output switching means, frequency controlled means for producing said control signals, coupling means selectively connecting said output switching means and said frequency controlled means and responsive during presence of an electrical condition to sever the connection therebetween, timing means connected to said direct voltage source and operative for a predetermined time interval following initial application thereof to produce a discrete output condition, means reponsive to said output condition to apply said electrical condition to said coupling means, and means responsive to said output condition to disable said magnetic amplifier means.

2. An inverter circuit for converting power from a direct voltage source to an alternating voltage comprising in combination, output switching means operative in response to control signals to produce alternating current in a load by alternately connecting opposite terminals of said direct voltage source thereto, frequency controlled means producing said control signals, coupling means selectively connecting said output switching means and said frequency controlled means and responsive during presence of an electrical condition to sever the connection therebetween, a mono-stable triggering circuit operative to produce a fixed output in response to current in said load in excess of a predetermined level, and means operative in response to receipt of a predetermined number of said fixed outputs to apply said electrical condition to said coupling means.

3. In a multi-phase inverter circuit for converting power from a direct voltage source into multi-phase alternating current, an accurate frequency source, phase splitting means responsive to the output of said frequency source to produce a plurality of identical electrical signals separated in phase by a selected amount, a load having portions individual to each phase of said electrical signals, switching means individual to each phase and responsive to the electrical signals thereof to alternately connect opposite terminals of said direct voltage source across a discrete portion of said load, control means individual to each phase interconnecting the electrical signals and the switching means therein, said control means being operative in response to an electrical condition to sever the interconnection therebetween, and protection means connected to said control means and said load and operative to generate said electrical condition for a fixed period of time following application of said direct voltage source to said inverter circuit and when the alternating current in any portion of said load exceeds a predetermined value for a fixed period of time.

4. In a multi-phase inverter circuit for supplying power from a direct voltage source to a multi-phase alternating current load, separate control signals for each phase, switching means individual to each phase and responsive to said control signals to alternately connect opposite terminals of said direct voltage source across one phase of said load, normally operative means individual to each phase interconnecting said control signals to said switching means, means connected to said direct voltage source and operative for a predetermined time following initial application of said direct current source to said inverter circuit to disable said normally operated means, and means connected to said load and operative in response to excess current in any phase thereof for a predetermined period of time to disable said normally operative means.

5. A multi-phase inverter circuit as defined by claim 4 wherein said last mentioned means comprises a common timing circuit controlled by the alternating current output of each phase to produce a fixed duration output in response to excess current therein during any half-cycle of operation, and means responsive to a plurality of said fixed duration outputs to disable said normally operative means.

6. An inverter for converting power from a direct voltage source to an alternating voltage comprising in combination, output switching means operative in response to control signals to produce alternating current in a load by alternately connecting opposite terminals of said direct voltage source thereto, frequency controlled means for producing said control signals, coupling means selectively connecting said output switching means and said frequency controlled means and responsive during the presence of an electrical condition to sever the connection therebetween, and protection means for generating said electrical condition for a fixed period following the initial application of said direct voltage source to said inverter and when said alternating current exceeds a predetermined value for a fixed period of time, said protection means including timing means connected to said direct voltage and operative for a predetermined time following initial application thereof to produce a discrete output condition, and means responsive to said output condition to apply said electrical condition to said coupling means.

7. An inverter for converting power from a direct voltage source to an alternating voltage comprising in combination, output switching means operative in response to control signals to produce alternating current in a load by alternately connecting opposite terminals of said direct voltage source thereto, frequency controlled means for producing said control signals, coupling means selectively connecting said output switching means and said frequency controlled means and responsive during the presence of an electrical condition to sever the connection therebetween, and protection means for generating said electrical condition for a fixed period following the initial application of said direct voltage source to said inverter and when said alternating current exceeds a predetermined value for a fixed period of time, said protection means including first timing means operative to produce a fixed duration output for each half cycle of operation in which said alternating current exceeds said predetermined value, second timing means responsive to the energy of said fixed duration outputs and operative to produce a second output following a predetermined number of applications of said fixed duration output thereto, and means responsive to said second output to apply said electrical condition to said coupling means.

8. An inverter for converting power from a direct voltage source to an alternating voltage comprising in combination, output switching means operative in response to control signals to produce alternating current in a load by alternately connecting opposite terminals of said direct voltage source thereto, frequency controlled means for producing said control signals, coupling means selectively connecting said outputs switching means and said frequency controlled means and responsive during presence of an electrical condition to sever the connection therebetween, and protection means for generating said electrical condition for a fixed period following the initial application of said direct voltage source to said inverter and when said alternating current exceeds a predetermined value for a fixed period of time, said protection means including first timing means connected to said direct voltage and operative a predetermined time following initial application of said direct voltage source to produce a first output, second timing means operative to produce a fixed duration output for each half-cycle of operation in which said alternating current exceeds a predetermined value, third timing means responsive to the energy of said fixed duration output and operative to produce a third output following a predetermined number of applications of said fixed duration output thereto, and means responsive to said first output and said third output to apply said electrical condition to said coupling means.

References Cited by the Examiner

UNITED STATES PATENTS

| | | | |
|---|---|---|---|
| 2,638,569 | 5/1953 | Holt | 321—14 |
| 3,046,412 | 7/1962 | Seike | 321—14 |
| 3,122,697 | 2/1964 | Kauders | 317—22 |
| 3,168,692 | 2/1965 | Lilienstein | 321—5 |

OTHER REFERENCES

"Static Inverter Delivers Regulated 3-Phase Power," by M. Lilienstein, published in Electronics, July 8, 1960, volume 33, No. 28, pages 55–59.

LLOYD McCOLLUM, *Primary Examiner.*

ROBERT L. SIMS, *Examiner.*